(12) United States Patent
Thomas et al.

(10) Patent No.: US 11,067,110 B2
(45) Date of Patent: Jul. 20, 2021

(54) DEVICE COUPLING FOR A MOTOR

(71) Applicant: BECKMAN COULTER BIOMEDICAL, LLC., Washington, DC (US)

(72) Inventors: Richard A. Thomas, Miami, FL (US); Michael A. Thomas, Davie, FL (US)

(73) Assignee: Beckman Coulter, Inc., Brea, CA (US)

( * ) Notice: Subject to any disclaimer, the term of this patent is extended or adjusted under 35 U.S.C. 154(b) by 711 days.

(21) Appl. No.: 14/836,087

(22) Filed: Aug. 26, 2015

(65) Prior Publication Data

US 2016/0053790 A1 Feb. 25, 2016

Related U.S. Application Data

(63) Continuation of application No. 13/696,277, filed as application No. PCT/US2011/035420 on May 5, 2011, now abandoned.

(60) Provisional application No. 61/331,795, filed on May 5, 2010, provisional application No. 61/331,793, filed on May 5, 2010, provisional application No. 61/331,789, filed on May 5, 2010, provisional application No. 61/331,785, filed on May 5, 2010.

(51) Int. Cl.
| | | |
|---|---|---|
| *G01N 21/85* | (2006.01) | |
| *F16B 7/18* | (2006.01) | |
| *G01N 35/10* | (2006.01) | |
| *G01N 21/05* | (2006.01) | |
| *H02K 7/00* | (2006.01) | |
| *G01N 15/14* | (2006.01) | |

(52) U.S. Cl.
CPC .............. *F16B 7/182* (2013.01); *G01N 21/05* (2013.01); *G01N 35/1011* (2013.01); *G01N 35/1079* (2013.01); *H02K 7/003* (2013.01); *G01N 15/14* (2013.01)

(58) Field of Classification Search
CPC ........... G01N 35/1011; G01N 35/1079; G01N 21/05; F16B 7/182; H02K 7/003
USPC .......................................................... 250/573
See application file for complete search history.

(56) References Cited

U.S. PATENT DOCUMENTS

| 964,579 A | 7/1910 | Stephens |
|---|---|---|
| 1,708,981 A | 4/1929 | Vickers |

(Continued)

FOREIGN PATENT DOCUMENTS

| CN | 1083902 A | 3/1994 |
|---|---|---|
| CN | 1763391 A | 4/2006 |

(Continued)

OTHER PUBLICATIONS

European Search Report for Application No. 15002794.4 dated Feb. 10, 2016.

(Continued)

*Primary Examiner* — Georgia Y Epps
*Assistant Examiner* — Kevin Wyatt
(74) *Attorney, Agent, or Firm* — Merchant & Gould P.C.

(57) ABSTRACT

A diagnostic instrument is disclosed. The diagnostic instrument may have a highly efficient probe washer station and/or may be able to sense whether there is a tube septum on a specimen tube to be sampled. The instrument may also be able to determine where the bottom of the tube is located. The probe washer station may have a flow of saline that is used to wash both the internal cavity and the external circumference of the probe.

17 Claims, 15 Drawing Sheets

(56) References Cited

U.S. PATENT DOCUMENTS

| | | | |
|---|---|---|---|
| 2,835,518 A * | 5/1958 | Naab | F16D 1/094 |
| | | | 29/895.21 |
| 4,645,473 A | 2/1987 | Mochizuki | |
| 4,791,699 A * | 12/1988 | Sovis | A47L 5/24 |
| | | | 15/344 |
| 5,010,970 A * | 4/1991 | Yamamoto | B62D 5/0412 |
| | | | 180/444 |
| 5,197,769 A | 3/1993 | Williamson | |
| 5,245,318 A | 9/1993 | Tohge et al. | |
| 5,475,487 A | 12/1995 | Mariella, Jr. et al. | |
| 5,924,747 A | 7/1999 | Miyashita | |
| 6,183,697 B1 | 2/2001 | Tanaka et al. | |
| 6,592,822 B1 | 7/2003 | Chandler | |
| 6,751,293 B1 * | 6/2004 | Barrett | H01J 35/101 |
| | | | 378/121 |
| 8,070,375 B2 * | 12/2011 | Moore | F16K 31/047 |
| | | | 403/13 |
| 2006/0202577 A1 * | 9/2006 | Maekawa | H02K 7/086 |
| | | | 310/90 |
| 2006/0203226 A1 | 9/2006 | Roche et al. | |
| 2006/0229367 A1 | 10/2006 | Neas et al. | |
| 2007/0003434 A1 | 1/2007 | Padmanabhan et al. | |
| 2007/0025879 A1 | 2/2007 | Vandergaw | |
| 2007/0278154 A1 | 12/2007 | Nagaoka et al. | |
| 2008/0076587 A1 * | 3/2008 | Cufr | F16C 3/02 |
| | | | 464/182 |
| 2008/0092961 A1 | 4/2008 | Bair et al. | |
| 2008/0185928 A1 * | 8/2008 | Buhler | F04D 19/048 |
| | | | 310/90.5 |
| 2009/0068062 A1 | 3/2009 | Jafari et al. | |
| 2009/0165581 A1 * | 7/2009 | Koyagi | F16H 25/2015 |
| | | | 74/89.23 |
| 2009/0324032 A1 | 12/2009 | Chen | |
| 2011/0134426 A1 | 6/2011 | Kaduchak et al. | |

FOREIGN PATENT DOCUMENTS

| | | | | |
|---|---|---|---|---|
| EP | 0742056 A1 | 11/1996 | | |
| EP | 0 484 392 B2 | 1/1998 | | |
| JP | 52-107458 | 9/1977 | | |
| JP | 58163822 | 9/1983 | | |
| JP | 61149615 A * | 7/1986 | | F04C 15/0073 |
| JP | 62-046021 | 2/1987 | | |
| JP | 63-160436 | 10/1988 | | |
| JP | 63-188331 | 12/1988 | | |
| JP | 64-88249 | 3/1989 | | |
| JP | 01-222886 | 9/1989 | | |
| JP | 1-269723 | 10/1989 | | |
| JP | 05087151 | 6/1993 | | |
| JP | 8-297121 | 12/1996 | | |
| JP | 11-270520 H | 10/1999 | | |
| JP | 2001-090544 A | 4/2001 | | |
| JP | 2001-90544 A | 4/2001 | | |
| JP | 2010230629 A | 10/2010 | | |
| RU | 94033466 | 6/1996 | | |
| RU | 2330708 C2 | 10/2008 | | |
| WO | 2006032044 A2 | 3/2006 | | |
| WO | 2007119928 A1 | 10/2007 | | |
| WO | 2008019448 A1 | 2/2008 | | |
| WO | 2008-058217 A2 | 5/2008 | | |
| WO | 2010037159 A1 | 4/2010 | | |

OTHER PUBLICATIONS

European Patent Office, European Search Report for Application No. 11778381.1 dated Mar. 3, 2015, 5 pages.

Patent Cooperation Treaty International Authority, International Search Report for Application No. PCT/US11/35420 dated Dec. 1, 2011, 4 pages.

European Patent Office; Communication pursuant to Article 94(3) EPC dated Sep. 22, 2017; 4 pages.

Japanese Patent Office; Notice of Reasons for Rejection dated Jul. 19, 2018; 14 pages.

PCT International Searching Authority; International Search Report for International Application No. PCT/US11/35420 dated Dec. 1, 2011; 12 pages.

* cited by examiner

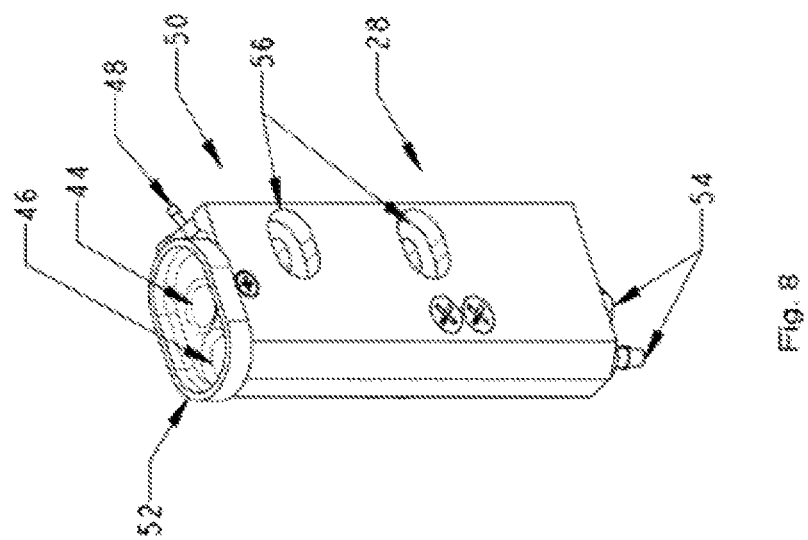
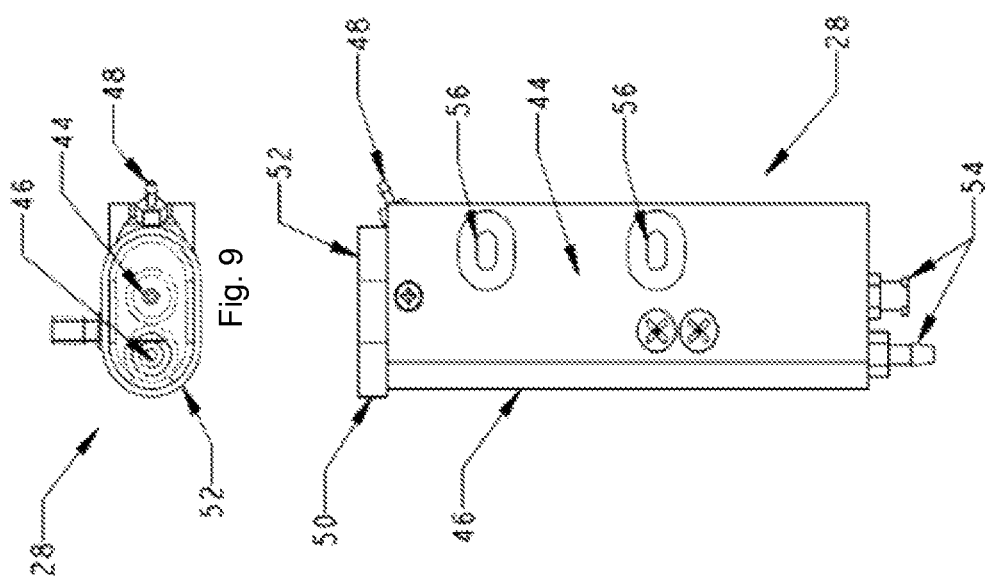
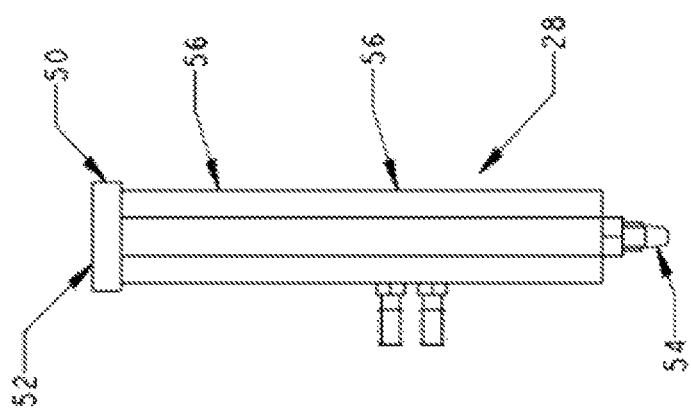

DEVICE COUPLING FOR A MOTOR

CROSS-REFERENCE TO RELATED APPLICATIONS

This application is a Continuation of U.S. Ser. No. 13/696,277 filed on Jan. 22, 2013, which is a National Stage of PCT/US2011/035420, filed 5 May 2011, which claims benefit of U.S. Ser. No. 61/331,795, U.S. Ser. No. 61/331,793, U.S. Ser. No. 61/331,789 and U.S. Ser. No. 61/331,785 all filed on 5 May 2010. All of the above disclosed applications are hereby incorporated by reference in their entireties. To the extent appropriate, a claim of priority is made to each of the above disclosed applications.

BACKGROUND OF INVENTION

The present invention relates generally to a diagnostic system, and more specifically to a diagnostic system and instrument that uses a probe. In the illustrated embodiments, the diagnostic instrument may be coupled to a probe washing system and method, and may also be coupled to other components through the coupling system disclosed. The instrument may also have a fluid level measuring system and a probe stall detection system.

SUMMARY OF INVENTION

Cellular analysis instruments using flow cytometers are known in the field. See, for example, U.S. patent application Ser. No. 11/825,523, incorporated herein by reference. A flow cytometer directs a flow of particles through a sensing zone where the particles can be excited by a beam of light. The beam of light causes the particles to fluoresce and/or scatter light, and the emitted light is separated by filters into portions of the electromagnetic (EM) spectrum. By studying the filtered EM spectrum, analyses of the cellular content can be performed and certain characteristics and values can be reported.

In one illustrated embodiment, the proposed system relates to a fluorescence-based, cellular analysis system capable of running standardized immune monitoring panels. The proposed system combines automated specimen/sample preparation (e.g. blood samples, bone marrow, serum, urine, synovial, spinal, peritoneal, plural, or any other type of fluid or sample) and analysis in a single, compact instrument. The single instrument provides improved accuracy, minimal clinician interaction (and therefore minimal clinician training), faster processing time, and processing options ranging from single-sample to a plurality of samples processing. Advantageously, such a plurality of samples may be processed and analyzed continuously.

A specimen autoloader can be provided for moderate-to-high volume laboratories. According to the embodiments disclosed herein, clinicians can load sample tube(s) into the system (either via autoloader or single-sample insertion through a front door) and walk away, with no need for follow-up. For example, a clinician would not need to return to transfer samples between preparation and analysis instruments and computers, because the single instrument would be able to perform all of those steps, in precisely the order and timing required by the tests to be performed. Additionally, the proposed system would allow for a number of types of tests to be performed on each sample, without slowing down or impacting the tests that are performed on adjoining or subsequent samples. For example, hypothetical Sample A could receive tests 4, 5, and 6, that require durations of 5, 7, and 15 minutes respectively, while hypothetical Sample B could receive tests 4, 7, and 8, requiring durations of 5, 10, and 8 minutes respectively.

Using the proposed device, both hypothetical samples A and B (as well as other samples) could be loaded at the same time, and the sample preparation could begin in the order received. Preparation would be followed by sample analysis, such that Sample A might begin analysis as Sample B is finishing its preparation. All actions related to the different sample preparations and analysis could be performed without clinician intervention. Moreover, a clinician could insert additional samples at any time, and such samples could be advanced above any samples waiting in the autoloader should the clinician so desire.

According to the present invention, such sampling and preparation is possible with a probe washer station that is highly efficient and capable of efficiently washing the sampling probe after each specimen and reagent sampling.

In another aspect of the invention, a clinician could insert additional samples into the diagnostic instrument at any time, and such samples could be advanced above any samples waiting in the autoloader should the clinician so desire. Regardless of the type of sample tube inserted and where it is inserted, the proposed device is able to process the contents of the tube as prescribed.

Hospitals around the world use a wide variety of tubes for drawing specimens (e.g. blood) from patients. Some tubes are covered with a cap or septum, while others are open tubes. It would be time consuming for the clinician to identify every type of tube that is to be analyzed.

The proposed device senses whether there is a tube septum, and further determines where the bottom of the tube is located. In this way, nearly any tube, regardless of whether it has a septum and regardless of the size and shape, may be processed by the proposed device.

In summary, a clinician can insert a variety of tubes, in a variety of configurations, into the proposed device. The device will be able to sense when its probe touches a septum or the bottom of a tube, and will be able to determine whether it should continue in the same direction to pierce the septum, or change directions so as to prevent damage to the tube or probe.

Fluid level sensors are known in the art. For example, sight glasses have been used for years as a simple way to see the level inside a container. Coffee makers and coffee dispensers are excellent examples of this type of simple concept, wherein a portion of the fluid is redirected to a small viewing chamber for a visible representation of the fluid level.

Another example of a fluid level sensor uses specific gravity, where an indicator or float rests above one type of material but below another (i.e. a floater on a body of water). Various other types of fluid level sensors based on mechanical or physical properties of the surface of the fluid have been explored.

Light has also been used to measure the level of fluids. For example, lasers have been pointed at the top of a surface and a timer circuit has been used to measure the time it took a laser pulse to reflect back from the surface. This fluid measurement is based on the reflection of light. Other prior art has focused on the absorption of certain light waves by the fluid to be measured.

In contrast to the above-disclosed systems, the present invention contemplates measuring fluid levels based on the refraction and absorption of light. In the disclosed method, infrared light is directed through a container having a fluid. When the container is non-planar, i.e. when the container has at least one surface that is curved, certain light can be expected to refract as it passes through the fluid-filled container. However, as the fluid level drops in the container, such light will not refract in the same way. Moreover, more of the light will be absorbed when it is directed through a liquid, rather than through an empty container. Thus, by monitoring the refraction of light at points along the height of the container, the level of fluid may be determined.

Additional features of the disclosure will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 8 is a perspective diagrammatic view of the probe washer station of FIG. 7;

FIG. 9 is a top diagrammatic view of the probe washer station of FIGS. 7-8;

FIG. 10 is a front elevation view of the probe washer station of FIGS. 7-9;

FIG. 11 is a side elevation view of the probe washer station of FIGS. 7-10;

DETAILED DESCRIPTION OF THE DRAWINGS

Figure 1:
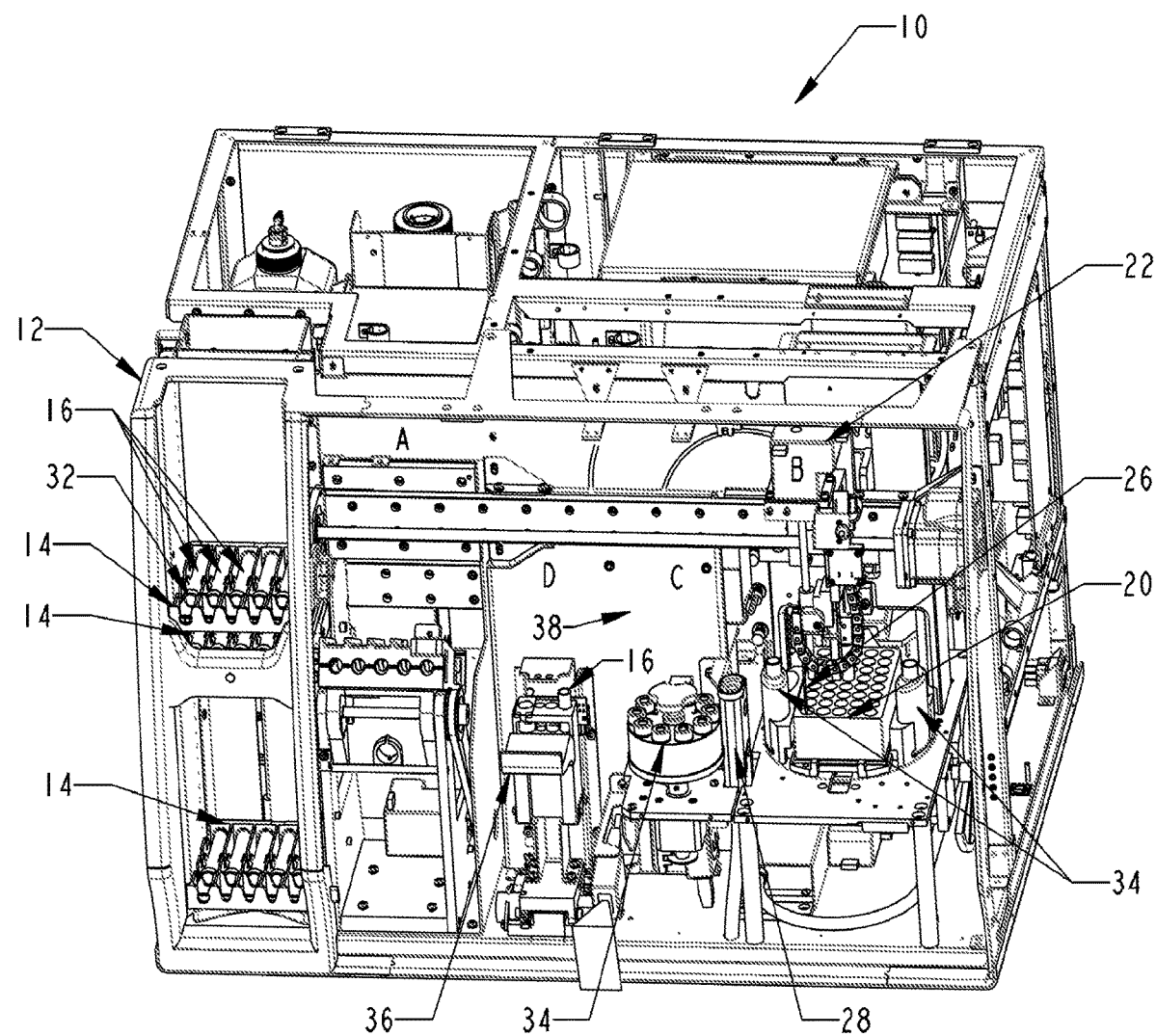
FIG. 1 is a perspective view of one embodiment of the proposed instrument, wherein the instrument is shown coupled with a specimen autoloader.
Figure 2:
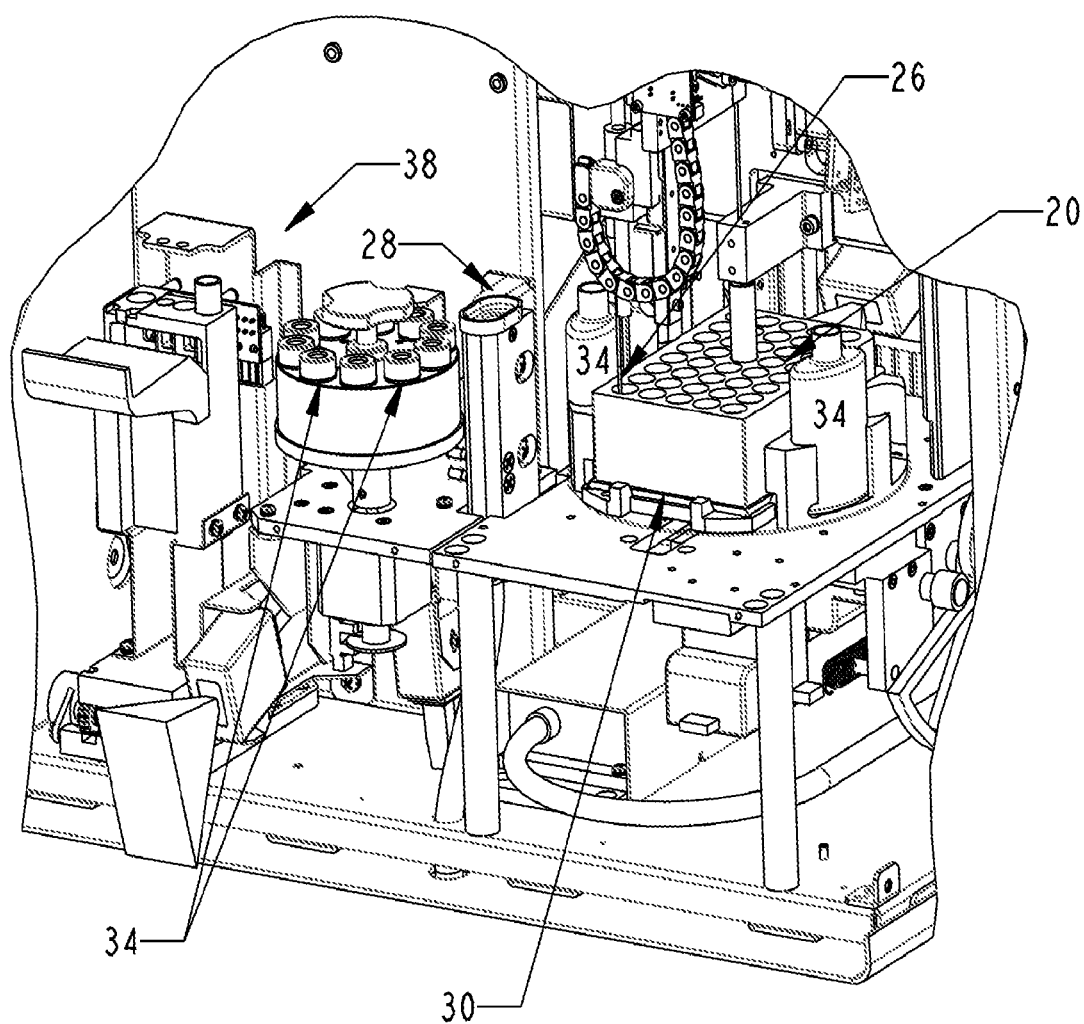
FIG. 2 is an enlarged perspective view of a portion of the diagnostic instrument shown in FIG. 1.
Figure 3:
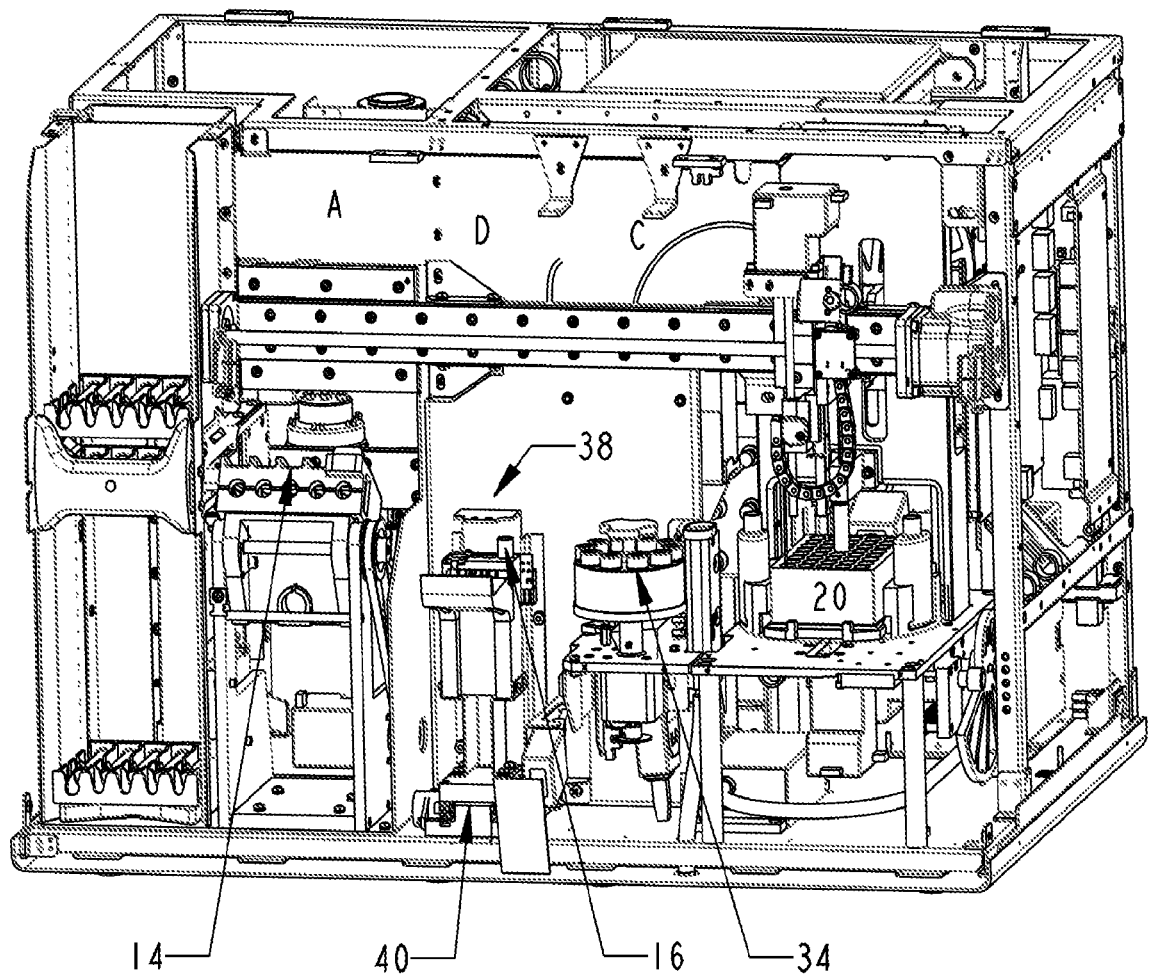
FIG. 3 is a front perspective view of the diagnostic instrument of FIGS. 1-2, showing the instrument during operation.
Figure 4:
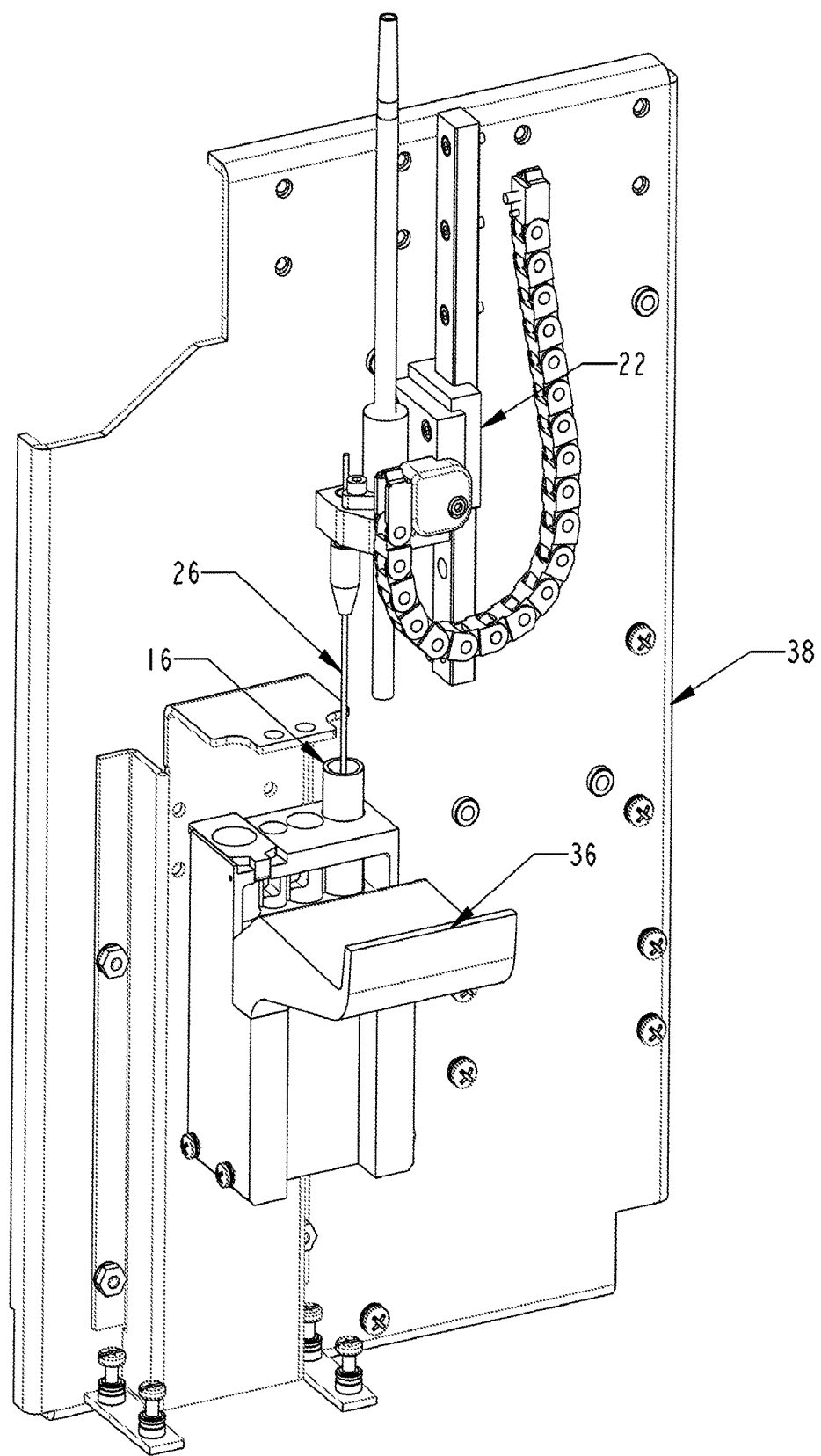
FIG. 4 is an enlarged view of the portion of the diagnostic instrument that is capable of sampling a single specimen tube at a time.
Figure 5:
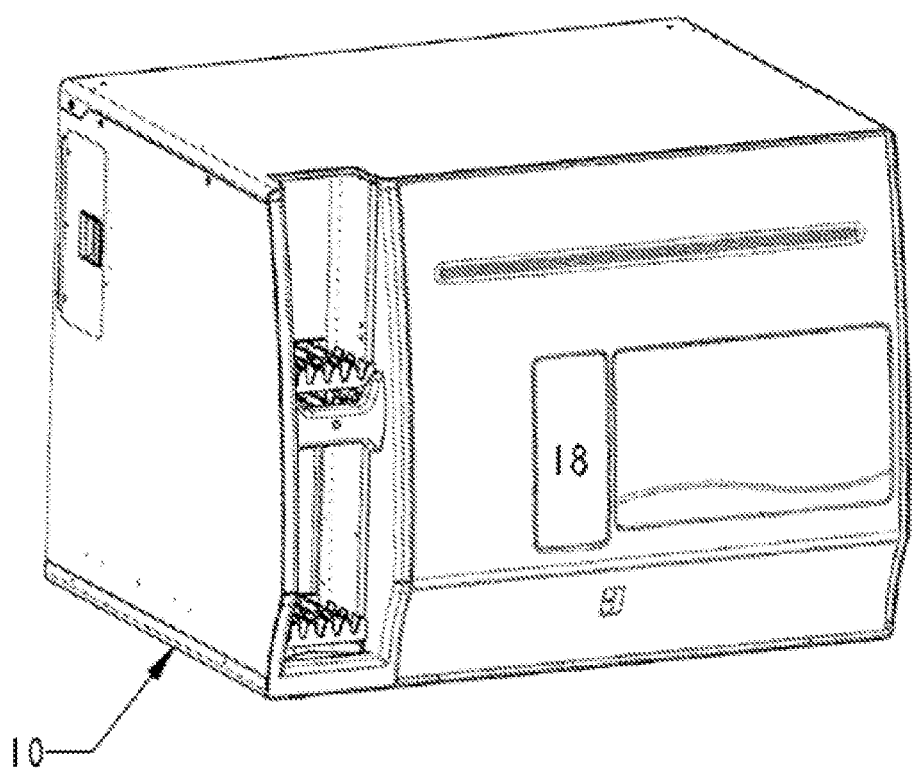
FIG. 5 is a front perspective view of the external housing of the proposed diagnostic instrument shown in FIGS. 1-4.
Figure 6:
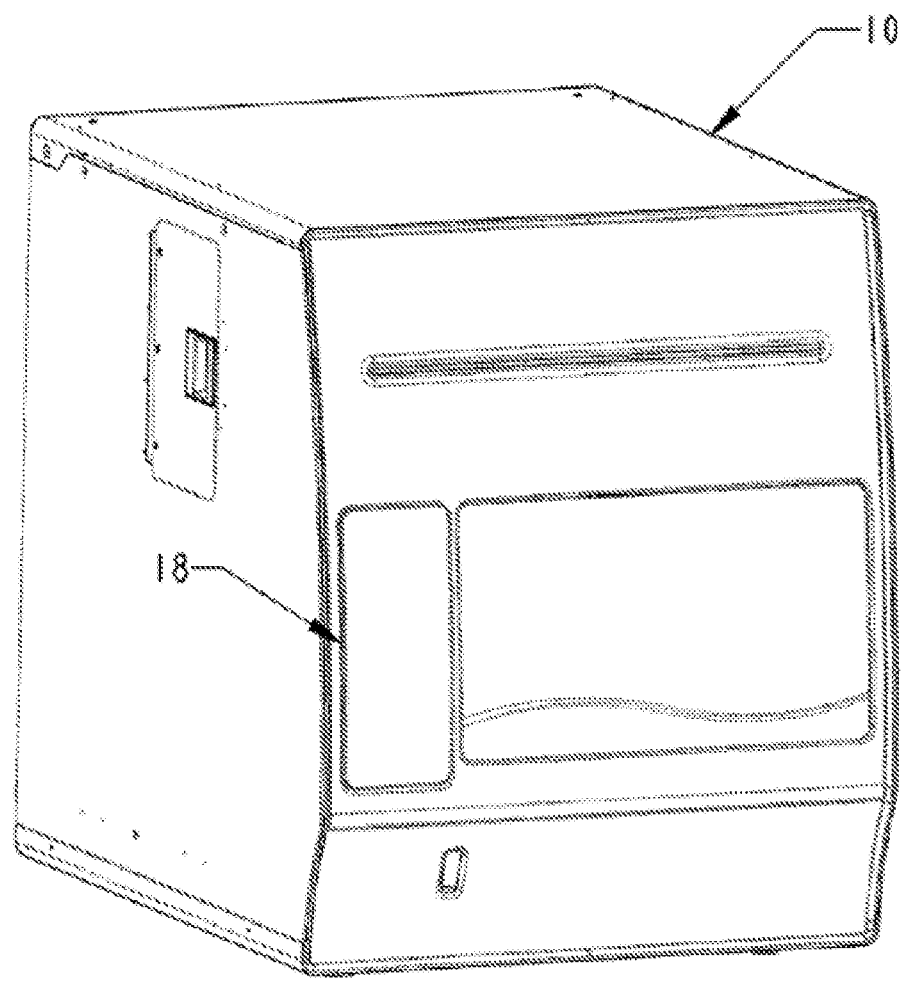
FIG. 6 is a front perspective view of the external housing of another embodiment, in which the specimen autoloader is removed and specimen tubes are inserted through the front door.
Figure 7:
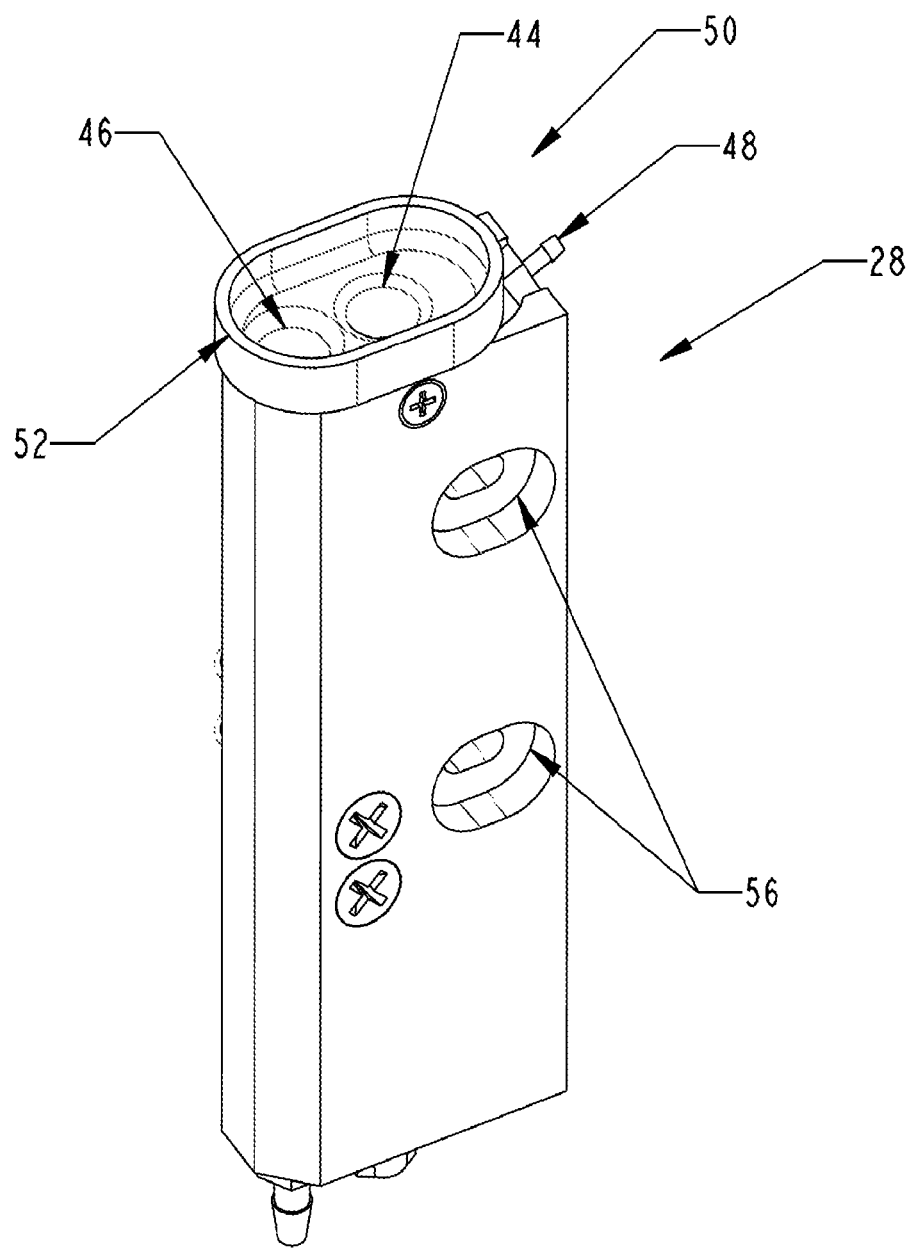
FIG. 7 is a perspective view of one embodiment of a probe washer station used in conjunction with the instrument shown in FIGS. 1-6.

One embodiment of the present disclosure is shown in FIGS. 1-6 in the form of a diagnostic instrument 10. In the illustrated embodiment, an autoloader portion 12 can be seen having a number of specimen cassettes 14 loaded thereon. In such an embodiment, cassettes 14 can be loaded with a plurality of identical specimen tubes or vials (hereinafter referred to as "tubes") 16, a variety of specimen tubes 16, or merely a single specimen tube 16. The cassettes are then top-loaded into autoloader portion 12 and processed in the order received. In the alternative, i.e. when faster, single-sample processing is desired, a specimen tube can be inserted directly into an alternative specimen entry point, i.e. door 18 (visible in FIG. 5) and processed ahead of any awaiting cassettes 14, as shown in FIG. 4. This provides for stat access to the testing by a clinician, with a capability to run tests immediately, thereby interrupting (but not negatively affecting) testing of other specimen tubes when desired by the clinician. Additionally, a specimen tube that has compromised or no bar coding (discussed infra) may be inserted manually.

As described in detail below, diagnostic instrument 10 illustratively performs the following steps once a specimen tube 16 (or specimen tube cassette 14) is received. It is contemplated that such steps are performed by instrument 10 without intervention by a clinician, and the steps may be modified, added to, or eliminated depending on the particular test(s) to be performed. It should be understood that while blood tubes are discussed throughout the disclosed embodiment, it is contemplated that other types of body fluids and samples are within the scope of the disclosure, and capable of being analyzed in the proposed instrument 10. For example, bone marrow, serum, urine, synovial, spinal, peritoneal, plural, and other types of fluids or samples may be tested and analyzed substantially as described below.

Mixing (e.g. rocking) samples while still in specimen tubes 16 (in the autoloader embodiment)

Piercing the cap of specimen tubes 16 and sampling the requisite amount of the specimen Reading barcodes to confirm sample/patient ID and/or to confirm type/size of tube Matching ID, test(s) to be performed, & reagents required, and assigning a serial number for tracking by the computer Placing the specimen/sample in selected empty tubes or wells in a containment area 20 (shown, for example, as a microtiter plate in FIGS. 1-3), for further processing Adding appropriate reagents in the appropriate sequence and timing so as to properly prepare the samples for the tests to be performed Allowing the samples to react with reagents for prescribed incubation times (variable based on the reagent)

Splitting the sample into a plurality of tubes wells in the containment area 20 (if desired or required by testing)

Tracking all samples, cassettes, reagents & relevant positions via barcodes or other type of tracking device (e.g. RFID)

Timely aspirating the prepared sample/reagent combination from the containment area and analyzing it via flow cytometer (while preparing subsequent samples)

Auto-verifying results or holding results for review, depending on clinician-initiated decision rules.

Instrument 10 is designed to provide automated and integrated specimen sampling, meaning that each of the above steps (if required by the particular tests) can be carried out within and by instrument 10, without the use of additional diagnostic equipment. Moreover, if desired by the clinician, such steps can be done without any interaction from the clinician.

In the illustrated embodiment, instrument 10 uses a single-axis probe carrier 22 that permits various functions to be performed while probe carrier 22 is moved along single-axis track 24. For example, probe carrier 22 (and therefore probe 26) can be positioned to draw samples from tubes 16 when probe carrier 22 is in position A, can deposit the samples in containment area 20 at position B, and can sample reagents at position C. If a sample is placed in pivotable tray 36 at any point (i.e. for stat processing of a sample), instrument 10 will sense the presence of the sample and insert it ahead of any samples awaiting processing in the autoloader 12. Probe carrier 22 will then move to position D so that probe 26 can sample from the tubes placed in pivotable tray 36. Reagents are deposited in containment area 20 either before or after the sample is deposited (or both before and after) for reaction with the sample as required by the particular test(s) to be performed.

The steps may be performed in the following order. However, it is contemplated that certain tests may skip one or more steps, or may modify a step in order to achieve the best test results for the desired blood test(s).

First, specimen tubes 16 may be loaded into a pre-configured cassette 14 that is appropriate for the particular specimen tubes 16 to be used. For example, specimen tubes 16 may be a commonly found size of 13 mm×75 mm specimen tube, in which case the five-tube cassette 14 shown in FIGS. 1 and 3 may be used. However, it should be understood that a variety of sizes and types of specimen tubes 16 may be used with the present invention, and cassettes 14 may be designed accordingly. A cassette 14 may even be configured to hold a variety of specimen tubes 16. As stated above, various sizes of specimen tubes 16 may also be inserted individually through door 18, shown in FIG. 5.

If specimen tubes 16 have a cap 32 (shown in FIG. 1), the specimen tubes (held by cassette 14) may be rocked such that the blood is stirred inside the tube and made more homogenous (for more accurate sampling). Such rocking occurs at station A, and cassette 14 can be seen in its rocked position in FIG. 3.

During rocking of cassette 14, probe carrier 22 may be directed to move to station C and begin sampling the appropriate portions of reagents 34 for the tests to be performed. However, if the test does not contemplate reagents 34 being placed on the containment area 20 prior to the blood sample, then probe carrier 22 may perform such step after sampling the blood from tube 16.

Reagents 34 may be held in vials, as can be seen at position C. However, reagents may alternatively or additionally be held in reservoirs positioned elsewhere, such as on the plate base 30 (shown in FIGS. 1-2), or in other areas (not visible) that can be, for example, plumbed directly to probe 26.

As set forth above, diagnostic instrument 10 also contemplates that a clinician can insert a specimen tube 16 via external door 18. To accommodate this, a tube receiver 38 is provided in illustrated instrument 10, and such tube receiver may accommodate a variety of types of specimen tubes 16, including pediatric tubes, as can be seen in FIGS. 2-4. In the illustrated example, specimen tubes 16 are held by a pivotable tray 36 that permits easy access and retrieval of specimen tubes 16. In an alternative embodiment, shown in FIG. 3, specimen tubes 16 may be held by a rotatable cassette 40.

In between and after sampling of specimens and/or reagents 34, probe carrier 22 may move to a probe washer station 28, so that probe 26 can be washed. Washing the probe 26 prevents cross-contamination and therefore prevents inaccurate test results.

Probe washer station 28 is shown in detail in FIGS. 7-11. According to the illustrated embodiment, probe washer station 28 includes a probe well 44 and an overflow well 46.

Probe 26 is washed in probe washer station 28 in substantially the following manner. Probe carrier 22 is moved to position C such that probe 26 can be directed (via motor 42) into probe well 44. Probe well 44 illustratively has an inner diameter that is slightly larger than the outer diameter of probe 26. As probe 26 is directed into probe well 44, a flow of saline and/or air is pumped through nozzle 48 and directed at a downward angle into probe well 44, as can be seen in FIGS. 7-10. Nozzle 48 may also be offset slightly so as to create a vortex flow of saline and/or air within probe well 44, thereby providing additional vortices about probe 26 when it is positioned in probe well 44. Such vortices assist with removing any fluids or other particles that may be on probe 26.

While the present disclosure contemplates the use of saline (which could be combined with air) as a washing solution, it should be understood that other types of fluids, or even the flow of air, may be desirable in certain applications.

Upper portion 50 of probe washer station 28 is illustrated to have a rim 52 that assists with containing saline to the probe well 44 and overflow well 46. Overflow well 46 is provided as an overflow for any saline that may come out of the top of probe well 44. Both probe well 44 and overflow well 46 are aspirated from the bottom of washer station 28 via exit ports 54. In the illustrative embodiment, vacuum pressure assists with the aspiration of exit ports 54.

In the illustrated embodiment, washer station 28 defines a plurality of mounting apertures 56, configured to receive a fastener or screw that would secure washer station to device 10.

It is contemplated that probe 26 may aspirate a portion of the saline into its internal cavity, and subsequently release the saline back into probe well 44, thereby rinsing the internal cavity of probe 26 with saline. In the alternative, probe 26 may itself be connected to a saline source, and saline can be directed through the internal cavity of probe 26 while probe 26 sits in probe well 44. In either case, such a process can be repeated several times as needed to insure the complete washing of specimen and reagent materials from probe 26. In yet another embodiment, fluids may be plumbed directly into probe 26.

The probe carrier 22 is coupled to a motor 42 that moves probe 26 toward and away from tube 16. In some cases, instrument 10 may have information related to the size and shape of the tube 16, as well as the presence of a septum. For example, if tube 16 were loaded into a cassette 14, cassette 14 may be bar coded or may otherwise provide an indication of the size and/or shape of tubes 16 found in the cassette 14. Moreover, in the illustrated embodiments, if tube 16 is in a cassette, it will have a septum (since the illustrated embodiments rock the cassettes 14 after loading).

In the event a clinician inserts a specimen tube 16 through door 18, such that tube 16 is placed in pivotable tray 36, instrument 10 may not be provided with any information as to the size or shape of the tube 16, as well as the presence of a septum. In such a case, the clinician may provide such information via a user interface. However, in the disclosed embodiment, instrument 10 may also use stall-detecting or touch-sensing features inherent in motor 42.

For example, a clinician may insert a tube 16 into an appropriately sized channel in tube receiver 38. (Illustratively, tube receiver 38 has a plurality of channel sizes so as to accommodate a variety of tube sizes.) Instrument 10 will determine where tube 16 is inserted, and move probe carrier 22 to a position above that tube 16. It is contemplated that tube detection may occur, for example, via a set or array of infrared detectors. The location of the bottom of tube 16 will be known or approximately known because tube receiver 38 will have a structure that holds the tubes 16 in an upright position.

As motor 42 begins to move probe 26 toward tube 16, probe 26 may encounter a septum, thereby causing resistance to motor 42. The present invention contemplates that instrument 10 will be able to determine that probe 26 has encountered a septum and not the bottom of tube 16, since the approximate bottom of tube 16 is known, as described above.

If a septum is encountered, motor 42 will be instructed to proceed through the septum and on toward the bottom of tube 16. If no septum is encountered, probe 26 will continue toward the bottom of tube 16 without interruption. In one embodiment, the instrument 10 may assume that tubes 16 are bottom-justified when a septum is encountered on the tubes. It may also be possible to detect the size and/or shape of a tube based on the septum's sensed position.

In both cases, once probe 26 encounters resistance at a position that approximates the bottom of tube 16, motor 42 will be instructed to stop advancing, and retract an adequate distance from which it can aspirate the specimen. The illustrative motor 42 is manufactured by IMS Schneider Electric, and available as model number MCI23A-NPE-03.

The present invention provides advantages over the prior art, which incorporated a capacitive sensor to sense the liquid level of specimens found in tubes 16. Such prior art sensors would sometimes report a false positive when they reached specimen droplets left at the top of the tube (under the septum). Moreover, the prior art sensors were not able to determine when the bottoms of the tubes 16 were reached.

After sufficient mixing is done of the specimen within the tubes (i.e. at station A), the specimen is sampled by probe 26 and deposited in predetermined wells or tubes in containment area 20. Depending on the test(s) to be performed, specimen samples may be placed in more than one well or tube, and the corresponding amount of specimen (such as blood) may be aspirated in advance. Probe 26 is then washed at washer station 28 as described above.

Depending on whether or not reagents are added to the specimen samples after depositing them in containment area 20, the probe carrier 22 may be moved to station C for sampling of the appropriate reagent(s) 34. Again, if more than one reagent is needed, probe 26 is washed at washer station 28 between each reagent 34 sampling and after the final reagent 34 sampling.

In order to deposit specimen samples and reagents in each well or tube of containment area 20, plate base 30 may be positioned on a rotating axis so that each well or tube could be presented to probe 26, depending on the point of rotation of the plate base 30. Such a configuration and rotational movement of plate base 30 is disclosed in U.S. patent application Ser. No. 11/804,721, incorporated herein by reference.

While it is contemplated that a multi-axis probe carrier may also accomplish these goals, certain advantages exist for a single-axis device. For example, a single axis device requires fewer parts and less programming, yields a smaller instrument 10 footprint, is easier to align, is more reliable and more stable, and ultimately faster in its movement between stations.

After placement in wells or tubes, the specimen samples are left to react with reagents for a specific amount of time (depending on the reagents and the tests to be performed) and then processed through the flow cytometer for analysis. It is contemplated that other test equipment may also be incorporated, such as equipment that uses electronic volume for cell sizing and differentiation, or hemoglobin measurement using absorbance.

Conveniently, containment area 20 serves as a common interface between sample preparation and analysis. Moreover, containment area 20 can include fixed or detachable and/or disposable or reusable components, allowing a clinician to opt to throw away the entire interface (as in the example of a microtiter plate) after use. By serving as the common interface between the preparation arm and analysis arm, containment area 20 provides a system with less exposure to mistakes and external or environmental influences.

A software scheduler (not shown) is also incorporated in the disclosed system. The software scheduler is illustratively programmed to recalculate available windows for fixed reaction kinetics (optimizing throughput while maintaining reproducible reaction kinetics) (i.e. antibody incubations, RBC lysing time, reaction quench time, etc.).

It is also contemplated that numerous items can be barcoded and tracked during operation. Such barcoding and tracking can be registered by the software scheduler. For example, barcodes may be assigned to the reagent vials 34, specimen tubes 16 (with different bar codes for different patients and/or sizes), sheath fluids, common interfaces (i.e. containment areas 20), preparation reagents, bead reagents, cassettes 14, etc. By bar coding these various items, a variety of significant information can be tracked, such as reagent usage/consumption, how many tests remain for each reagent bottle, open container expiration, closed container expiration, assay values, etc.

The software scheduler may be configured to perform the following steps.

Decide if it is ok to add a new sample at this time or not, and hold off door or multi-loader (random access) if another activity needs to take precedence.

Minimize the sample door 18 unavailable effect by adjusting non-kinetic reactions if any, or kinetic reactions that have a broader acceptable window.

Minimize collision effects, and optimize throughput by defining acceptable windows for each kinetic reaction.

Force analysis to take a predetermined amount of time (stop on time/fixed volume of sample)

Use predetermined times for each cycle, (acquiring of blood, adding of reagents including mixing, analysis) so all activities can be properly scheduled.

Take all scheduled sample time windows into effect in determining if it is acceptable to add a new sample to the schedule, and schedule such new sample so that all its activities take place at the predetermined times.

Take hardware resources and physical hardware collisions into effect in determining if the schedule can be accomplished.

Using instrument 10 in combination with the software scheduler disclosed herein, a Time to First Result (TFR) can be less than 15 minutes, with subsequent results reported about every 90 seconds. Throughput can be more than 300 samples per day, and results can be reported much quicker and earlier in the day, so a lab's capacity can be significantly increased.

With all sample preparation and analysis fully integrated in one instrument 10, a clinic need not perform slow and tedious "batch processing," where the samples are collected and processing started once a sufficient number are collected—progressing through each step of the blood processing with the entire group of samples. In contrast, instrument 10 is configured to automatically prepare patient samples in containment area 20, so there are no daughter tubes to label and keep track of, and significantly less blood and reagents are needed. Samples can be loaded onto the system at any time, and in the illustrative embodiment, each will be automatically processed and exit the system pipeline in approximately 15 minutes. Subsequent samples could exit the system pipeline in approximately 90 second intervals, although exact times will vary depending on the tests to be performed and required sample preparation times.

A significant advantage is the cost savings for a lab. Not only can more samples be processed in a single day, by using one system, there are lower system costs, lower reagent costs and reduced hands-on labor. Accordingly, the overall cost to own and operate the instrument 10 is significantly lower.

Prior art processes and systems, with their multiple modules and computer screens, take up between 10 and 13 feet of valuable bench space. In contrast, diagnostic instrument 10 is compact, measuring only 31 inches wide, inclusive of the autoloader portion 12. The embodiment shown in FIG. 6, without an autoloader portion, requires an even smaller footprint. A touch-screen computer/screen (not shown) can also be conveniently placed on top of the system, keeping the footprint small and freeing up valuable space for the lab.

It is contemplated that the proposed system may be ideal for clinical researchers running one or more fixed immune surveillance panels for contract research, pharmaceutical drug development, and research in university medical centers and reference labs. It is further contemplated that the standardized immune monitoring panels may be monitoring for immunodeficiency (HIV-AIDS), autoimmune diseases, organ transplant response, infectious diseases, oncology and others.

Figure 12:
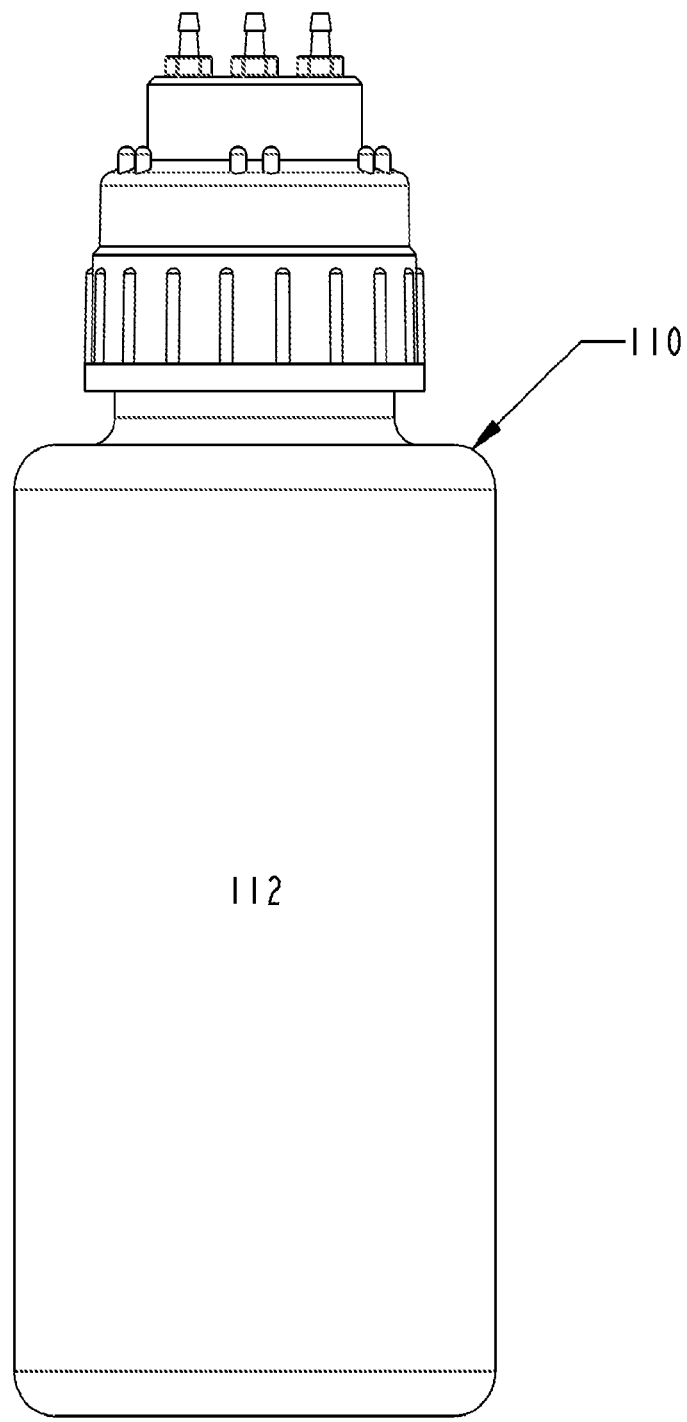
FIG. 12 is a front view of one embodiment of the proposed invention, showing a fluid container positioned in a holder.
Figure 13:
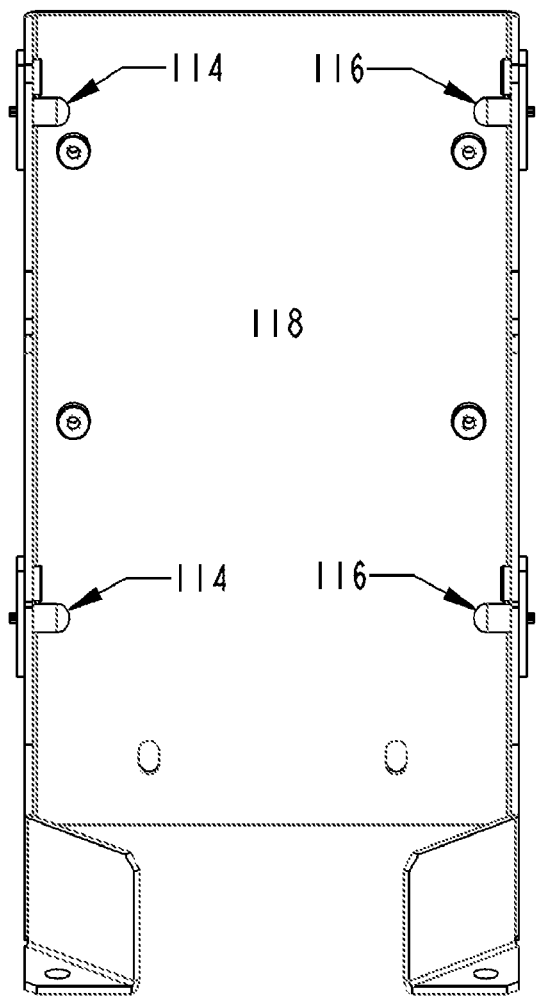
FIG. 13 is a perspective view of the holder of FIG. 12, showing a plurality of light transmitters and light receptors positioned along the height of the container.

Yet another embodiment of the present disclosure is shown in FIGS. 12 and 13, wherein a container 110 is equipped with at least one light transmitter 114 (visible in FIG. 13) and at least one light receptor 116 (visible in FIG. 13). According to the invention, light transmitter 114 directs infrared light into container 110 at a point at which fluid detection is desired. Light receptor 116 is positioned to receive light from the transmitter 114.

As can be seen in FIG. 12, a translucent or transparent container is contemplated, such that infrared light may pass through the container. Container 110 may also have at least one non-planar side 112 so that light passing through it refracts. In one disclosed embodiment, transmitter 114 and receptor 116 are coupled to a frame 118 that can be positioned around at least a portion of container 110.

In the illustrated embodiment, light receptor 116 can detect a difference in the strength of light received from light transmitter 114. For example, based on the strength of the light received from transmitter 114, light receptor 116 will be able to sense whether the light passed through a liquid on its way to receptor 116. This information will be used to determine the level of the fluid. In the case of a fluid such as water or saline, the present disclosure uses the absorbance spectra of water, which has a broad peak starting around 890 nm. Container 110 may be constructed of polypropylene, which also has a known absorbance spectra.

Another way in which fluid level may be determined is the amount by which the light refracts as it passes through container 110. Such light will refract a known amount (i.e. have a predictable refractive index value) when it passes through the container but not through the fluid (i.e. the fluid is below the point of passage of the light). In contrast, when the container is filled with fluid, the light transmitted by transmitter 114 will refract by a different amount, therefore having a different refractive index value. Because these two values can be distinguished, the infrared light can be used to determine whether the container holds fluid at the selected level.

It is contemplated that transmitter 114 and receptor 116 may be positioned at a single point on the container 110, such that it can indicate when the fluid has been depleted beyond a pre-selected level—similar to a low fuel warning light in a vehicle. However, it may be desirable to have a plurality of transmitters 114 and receptors 116 positioned at various locations along the height of container 110, as can be seen in FIG. 13, such that a user can determine with better accuracy the fluid level at numerous points on the container. Transmitters 114 and receptors 116 may be user configurable (i.e. the positions may be changed by a user) or may be set by the manufacturer.

Transmitter 114 is illustratively an LED from Panasonic, part number: LNA 2904L. Receptor 116 illustratively uses a transistor from Fairchild Optical Electrical: part number QSD123.

Figure 14:
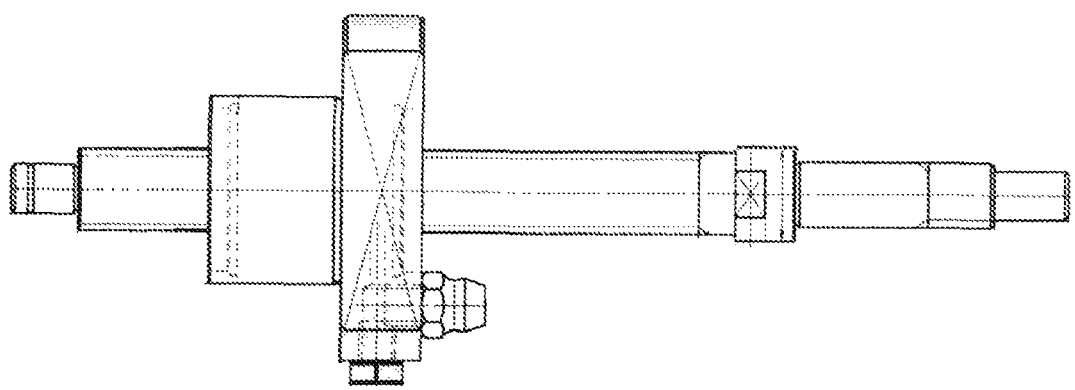
FIG. 14 is a front elevation view of a prior art lead screw coupling.
Figure 15:
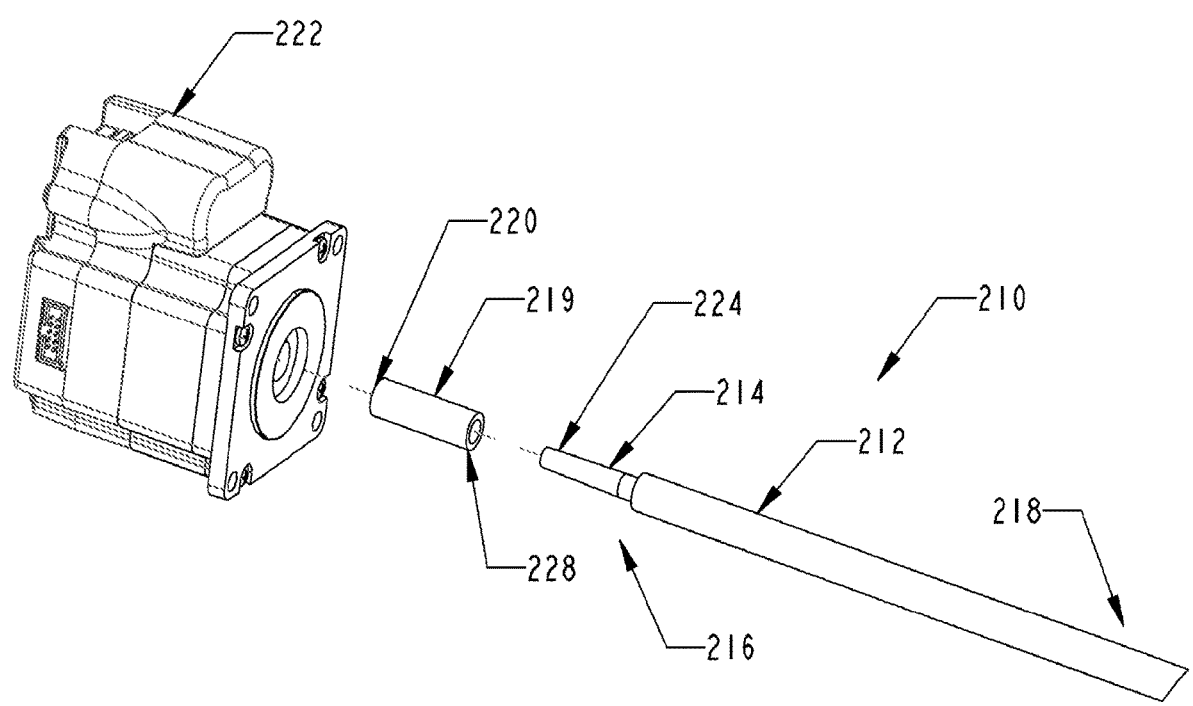
FIG. 15 is a perspective view of a coupling embodiment of the present invention.
Figure 16:
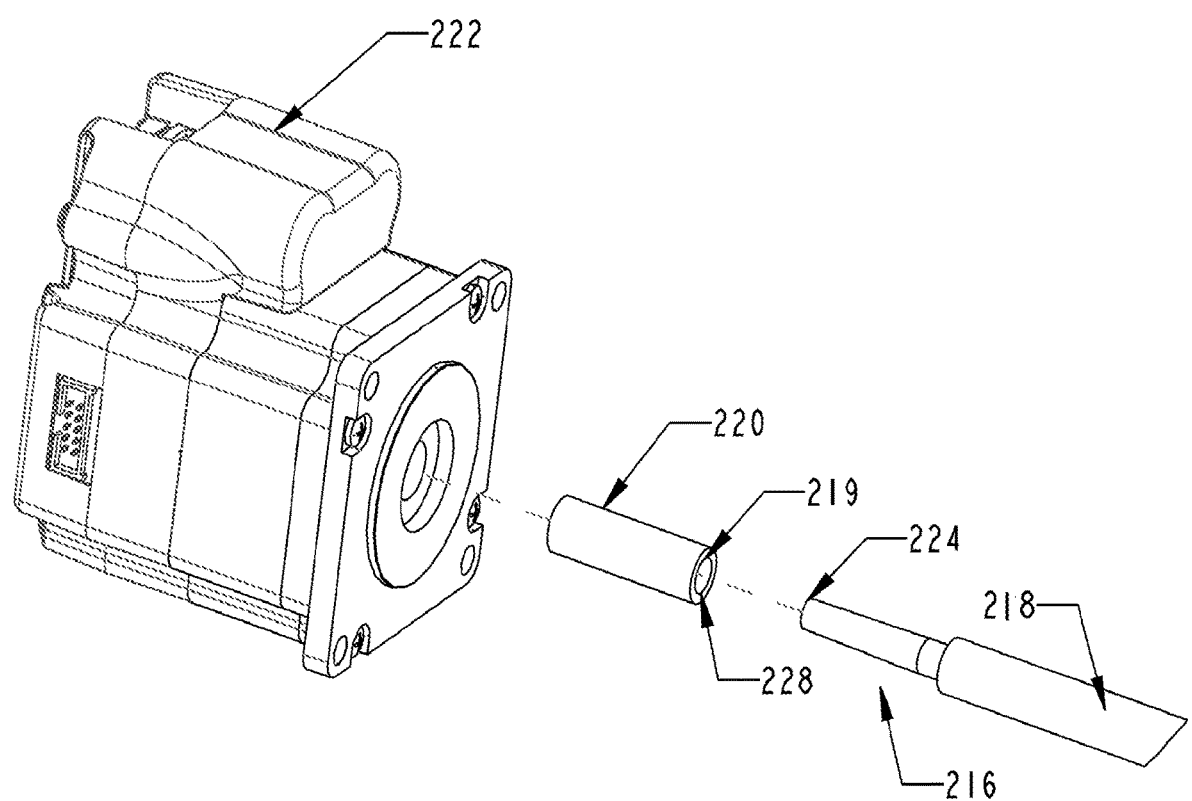
FIG. 16 is an enlarged view of the coupling shown in FIG. 15.

Still another embodiment of the present disclosure is shown in FIGS. 15-16 in the form of a device coupling 210. Such a coupling may be contrasted, for example, with the prior art coupling shown in FIG. 14. In the embodiment illustrated in FIGS. 15-16, device coupling 210 includes a lead screw 212 having a tapered surface 214 formed on one end 216 of the shaft 218. For example, tapered surface 214 may be fashioned similar to a Brown and Sharpe tapered surface, and may be ground to its shape.

A complementary and mating taper 219 is formed in female portion 220, creating a recess 228. Female portion 220 may be attached to a motor 222, or may be an integral part of motor 222.

Shaft 218 has a threaded hole 224 at end 216 of the shaft 218. In order to join shaft 218 to female portion 220 (and therefore motor 222), tapered surface 214 is inserted into recess 228 of female portion 220. A screw (not shown) is used to pull shaft 218 into female portion 220. Notably, the surface area between tapered surface 214 and mating taper 219 are sufficient to provide enough friction to prevent rotation of the parts relative to each other at the typical operating speeds of the motor. The screw functions merely to keep the two surfaces 214, 219 joined.

Disassembly of device 210 is accomplished by loosening the screw and lightly tapping the first end 216 of shaft 218 out of its mated position. Another advantage of the present invention is ease of separation of two expensive components.

Figure 17:
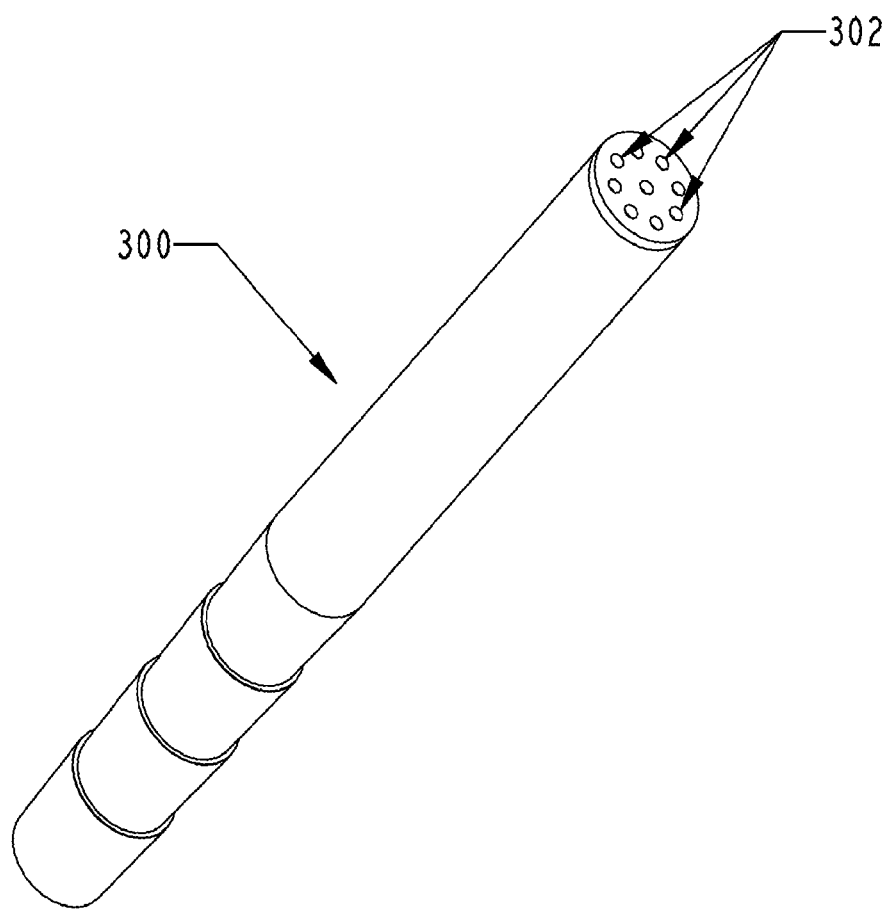
FIG. 17 shows a filter according to one embodiment of the invention.

In still another embodiment of the invention, a flow cytometer filtration system is shown in FIG. 17. As a matter of background, flow cytometers generally comprise a small hole (typically square or rectangular in cross section) on the order of magnitude of 100-300 microns per side and usually greater than 1000 microns long. The diagnostic measurements that flow cytometers make are on particles that are usually less than 50% of the cross sectional area of the measuring hole or aperture. The small size is necessary to hydro-dynamically focus the particles to the center of the aperture where the particles are interrogated with a laser beam. This can have the negative consequence of being very susceptible to clogs.

Accordingly, most flow cytometers require that the samples be pre-filtered, but this does not prevent all clogs. In order to have a more optimal flow cytometer-based automated instrument, this problem should be addressed.

One method is to have automated back-flushing routines that are activated by some method of automatically detecting clogs. However, this produces significant slow-down in the operation of the instruments, and is not always 100% effective. Failure to remove the clog by the automated routines requires operator or service intervention.

What is disclosed in FIG. 17 is a unique filter 300 that prevents clogs. The filter has the following properties:
  it has multiple holes 302 that are less than or equal to the cross sectional area of the flow cytometer aperture;
  it is located near the sample injector of the flow cytometer in an area where the fluid velocity is very low (typically less than 200 micro liters per minute).
  it can be back flushed at a high fluid velocity;
  the hole 302 lengths are short (typically less than 300 microns); and
  there are multiple holes to reduce overall fluid resistance, reduce fluid velocity through any single hole 302, and provide multiple pathways in the instance where one or more of the holes is partially blocked.

Such a system may be used, for example, with a flow cytometer aperture that forms an equilateral triangle.

Figure 18:
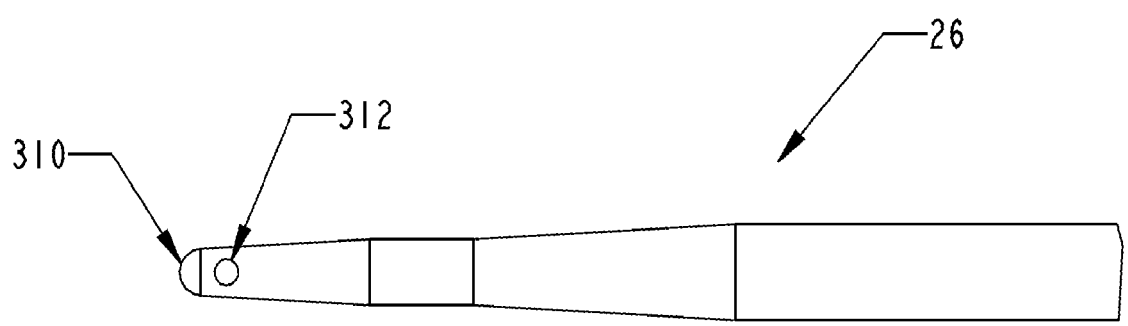
FIG. 18 is an enlarged view of a probe tip according to yet another embodiment of the invention.

One embodiment of a probe tip associated with the present invention is shown in FIG. 18. One of the elements of the disclosed system that assists with producing reliable counting, mixing and minimal debris is the probe 26 geometry. As can be seen in FIG. 18, an illustrative probe 26 has a solid blunt end 310 that can eliminate coring of the septum material. Probe 26 may also have two holes 312 (one of which is visible in FIG. 18), such holes being substantially the same size as the internal bore (not shown) of probe 26. This construction has been shown to improve mixing and reduce the break up of cells caused by high-velocity shear forces.

Holes 312 are located near end 310 of probe 26 so as to reduce the amount of blood sticking to the probe. This improves the reproducibility of the counting. The amount of blood (or any other fluid) sticking to the outside of probe 26 due to surface tension can dramatically affect the counting.

Other systems may mix a sample of fluorescent beads with a know concentration with each sample to generate an accurate count. By using the disclosed geometry for probe 26, the fluorescent bead mixing is not necessary, and the expense and time of this step is eliminated.

While the disclosure is susceptible to various modifications and alternative forms, specific exemplary embodiments thereof have been shown by way of example in the drawings and have herein been described in detail. It should be understood, however, that there is no intent to limit the disclosure to the particular forms disclosed, but on the contrary, the intention is to cover all modifications, equivalents, and alternatives falling within the spirit and scope of the disclosure as defined by the appended claims.

A plurality of advantages arises from the various features of the present disclosure. It will be noted that alternative embodiments of various components of the disclosure may not include all of the features described yet still benefit from at least some of the advantages of such features. Those of ordinary skill in the art may readily devise their own implementations of a diagnostic device probe washer station and method that incorporate one or more of the features of the present disclosure and fall within the spirit and scope of the disclosure.

What is claimed is:

1. A device coupling for a motor, the device coupling comprising:
  a female portion associated with the motor, the female portion having a recess;
  a lead screw including a shaft having a tapered surface formed at one end of the shaft, the tapered surface being insertable into the recess of the female portion; and
  a screw configured to pull the shaft into the recess of the female portion and join the shaft to the female portion such that the shaft is prevented from rotating with respect to the female portion due to friction between the shaft and the female portion, the screw being coaxially aligned with a central axis of the shaft of the lead screw,
  wherein the shaft includes a threaded hole at the one end of the shaft.

2. The device coupling of claim 1, wherein the shaft and the female portion are configured and arranged to be disjoined by loosening the screw and lightly tapping the one end of the shaft.

3. The device coupling of claim 1, wherein the female portion includes a tapered surface that is complementary to the tapered surface of the shaft and that mates to the tapered surface of the shaft.

4. The device coupling of claim 1, wherein the recess is formed by a mating taper in the female portion.

5. The device coupling of claim 1, wherein the screw is configured to be threaded into the threaded hole.

6. The device coupling of claim 5, wherein when the screw is threaded into threaded hole, the shaft is pulled into the female portion.

7. The device coupling of claim 1, wherein the female portion associated with the motor is configured to be attached to the motor.

8. The device coupling of claim 1, wherein the female portion associated with the motor is an integral part of the motor.

9. The device coupling of claim 1, wherein the threaded hole of the shaft includes a threaded surface therein for engaging with the screw.

10. A motor and device coupling comprising:
  a motor; and
  a device coupling comprising:
    a female portion of the device coupling having a recess, the female portion being attachable to the motor;
    a lead screw including a shaft having a tapered surface formed at one end of the shaft, the tapered surface being insertable into the recess of the female portion; and
    a screw configured to pull the shaft into the recess of the female portion and join the shaft to the female portion such that the shaft is prevented from rotating with respect to the female portion due to friction between the shaft and the female portion, the screw being coaxially aligned with a central axis of the shaft,
    wherein the shaft includes a threaded hole at the one end of the shaft.

11. The motor and device coupling of claim 10, wherein the female portion includes a tapered surface that mates with the tapered surface of the shaft.

12. The motor and device coupling of claim 10, wherein the motor has one or more operating speeds, wherein when the shaft is joined to the female portion, the shaft is prevented from rotating with respect to the female portion at the one or more operating speeds of the motor.

13. The motor and device coupling of claim 10, wherein the screw is configured to be threaded into the threaded hole.

14. The motor and device coupling of claim 13, wherein when the screw of the female portion is threaded into threaded hole of the shaft, the shaft is pulled into the female portion.

15. A method of securing a shaft of a lead screw to a female portion of a device coupling for a motor, the method comprising:
    inserting a tapered surface formed at one end of the shaft into the female portion of the device coupling, the female portion having a recess and being associated with the motor, the shaft including a threaded hole at the one end of the shaft; and
    using a screw in the threaded hole to pull the shaft into the recess of the female portion and to join the shaft to the female portion such that the shaft is prevented from rotating with respect to the female portion due to friction between the shaft and the female portion, the screw being coaxially aligned with a central axis of the shaft.

16. The method of claim 15, wherein the device coupling is attached to or is part of a motor, and further comprising:
    rotating the motor so that the shaft also rotates,
    wherein, the friction between the tapered surface of the shaft and a tapered surface of the female portion prevents relative rotation between the shaft and the female portion while the shaft is rotated by the motor.

17. The method of claim 15, further comprising disassembling the coupling device, comprising:
    loosening the screw;
    lightly tapping the one end of the shaft; and
    removing the shaft from the female portion.

* * * * *